(12) United States Patent
Nicolaescu

(10) Patent No.: US 6,888,667 B2
(45) Date of Patent: May 3, 2005

(54) METHOD AND APPARATUS FOR SILICON-BASED OPTICALLY-PUMPED AMPLIFICATION USING STIMULATED SCATTERING

(75) Inventor: Remus Nicolaescu, San Francisco, CA (US)

(73) Assignee: Intel Corporation, Santa Clara, CA (US)

(*) Notice: Subject to any disclaimer, the term of this patent is extended or adjusted under 35 U.S.C. 154(b) by 193 days.

(21) Appl. No.: 10/291,295

(22) Filed: Nov. 8, 2002

(65) Prior Publication Data

US 2004/0090661 A1 May 13, 2004

(51) Int. Cl.[7] .................. G02F 1/365; H01S 3/063; H01S 3/30
(52) U.S. Cl. .................. 359/332; 359/326; 359/334; 372/3; 372/7
(58) Field of Search ................. 359/326–332, 359/334; 372/3, 6, 7

(56) References Cited

U.S. PATENT DOCUMENTS

| | | | | |
|---|---|---|---|---|
| 4,389,617 A | * | 6/1983 | Kurnit | 359/334 |
| 4,571,727 A | | 2/1986 | Nishizawa et al. | |
| 4,812,682 A | * | 3/1989 | Holmes | 359/108 |
| 5,033,051 A | * | 7/1991 | Werner | 372/3 |
| 5,673,281 A | | 9/1997 | Byer | |
| 5,832,006 A | | 11/1998 | Rice et al. | |
| 6,388,800 B1 | | 5/2002 | Christodoulides et al. | |
| 6,433,922 B1 | * | 8/2002 | Ghera et al. | 359/334 |
| 6,456,425 B1 | | 9/2002 | Foursa et al. | |
| 6,519,082 B2 | * | 2/2003 | Ghera et al. | 359/341.4 |

FOREIGN PATENT DOCUMENTS

| | | |
|---|---|---|
| DE | 4113354 A1 | 10/1992 |
| EP | 0482630 A1 | 4/1992 |
| EP | 0561672 A1 | 9/1993 |
| GB | 2373628 A | 9/2002 |
| JP | 62-120090 * | 6/1987 |
| WO | PCT/US 03/34377 | 9/2004 |

OTHER PUBLICATIONS

Tang, C.K. et al., "Development of a Library of Low–Loss Silicon–On–Insulator Optoelectronic Devices," *IEEE Proceedings: Optoelectronics*, vol. 143, No. 5, Oct. 1996, pp. 312–315.

Claps, R. et al., "Stimulated Raman Scattering in Silicon Waveguides," *Electronics Letters*, vol. 38, No. 22, Oct. 24, 2002.

Claps, R. et al., "Observation of Raman Emission in Silicon Waveguides at 1.54 μm," *Optics Express*, vol. 10, No. 22, Nov. 4, 2002, pp. 1305–1313.

(Continued)

*Primary Examiner*—John D. Lee
(74) *Attorney, Agent, or Firm*—Blakely, Sokoloff, Taylor & Zafman LLP

(57) ABSTRACT

A semiconductor-based optical amplifier using optically-pumped stimulated scattering includes an optical signal source (pump) and a wavelength selective coupler. The coupler is connected to receive an input optical signal and the pump signal and output the combined signals in a waveguide having a semiconductor core. The intensity of the pump signal is selected so that stimulated scattering occurs when the pump signal is propagated in the semiconductor core. Further, the wavelength of the pump signal is selected so that the stimulated scattering causes emission of a signal shifted in wavelength to be substantially equal to the wavelength of the optical input signal. Consequently, the input signal is amplified as it propagates with the pump signal. The amplifier can be disposed between reflectors to form a laser.

44 Claims, 7 Drawing Sheets

OTHER PUBLICATIONS

Claps, R. et al., "Observation of Stimulated Raman Amplification in Silicon Waveguides," *Optics Express*, Voll. 10, No. 15, Jul. 28, 2003, pp. 1731–1739.

Claps, Ricardo et al., (Abstract) "Observation of Raman Emmission in Silicon Waveguides at 1.54 μm", Optical Society of America, vol. 10, No. 22/Optical Express, Nov. 2002.

Saito, Takao et al., "Spontaneous Raman Scattering in [100], [110], and [11–2] Directional GaP Waveguides", Journal of Applied Physics, vol. 90, No, 4, Aug. 15, 2001.

Suto, Ken et al.,"Semiconductor Raman Amplifier for Terahertz Bandwidth Optical Communication", Journal of Lightwave Technology, vol. 20, No. 4, Apr. 2002.

Ralston, J. M. et al., "Spontaneous–Raman–Scattering Efficiency and Stimulated Scattering in Silicon", Physical Review B, vol. 2, No. 6, Sep. 15, 1970.

Saito, Takao et al., "Raman Gain and Optical Loss in AlGaP Waveguides", Journal of Applied Physics, Nol. 87, No. 7, Apr. 1, 2000.

* cited by examiner

METHOD AND APPARATUS FOR SILICON-BASED OPTICALLY-PUMPED AMPLIFICATION USING STIMULATED SCATTERING

FIELD OF THE INVENTION

Embodiments of the invention relate generally to optical devices and, more specifically but not exclusively relate to semiconductor-based optical amplification.

BACKGROUND INFORMATION

Amplification of optical signals is often required in optical communication systems. Optical amplifiers can be implemented in optical fiber such as, for example, erbium doped fiber amplifiers (EDFAs), fiber Raman amplifiers. Such optical amplifiers can be useful in many optical fiber applications.

Optical amplifiers can also be implemented in semiconductor materials (e.g., semiconductor optical amplifiers or SOAs). However, SOAs tend to be low power, noisy and polarization sensitive.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
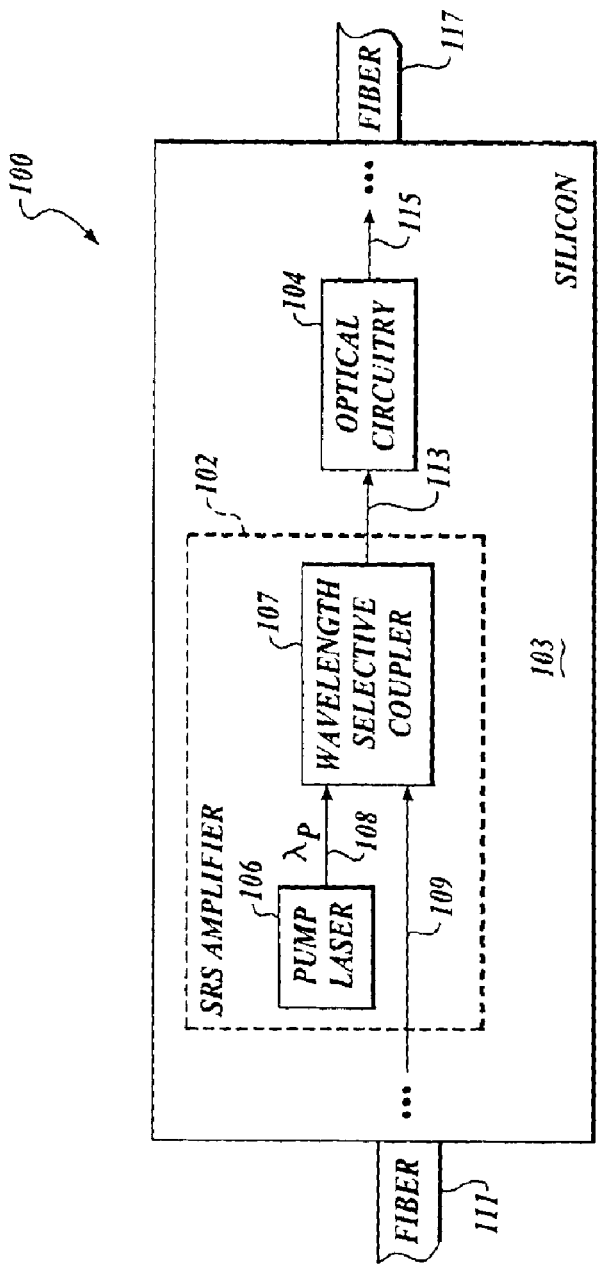
FIG. 1 is a block diagram illustrating a silicon-based stimulated Raman scattering (SRS) amplifier, according to one embodiment of the present invention.

FIG. 1 illustrates a semiconductor device 100 having disposed thereon a silicon-based stimulated Raman scattering (SRS) amplifier 102, according to one embodiment of the present invention. In this embodiment, semiconductor device 100 is implemented using a silicon substrate 103, and includes optical circuitry 104 that receives an amplified optical signal from SRS amplifier 102. In one embodiment, silicon substrate 103 is part of a silicon on insulator (SOI) wafer. SRS amplifier 102, in this embodiment, includes a pump laser 106 and a wavelength selective coupler 107.

The elements of this embodiment of semiconductor device 100 are interconnected as follows. Laser 106 has an output port connected to an input port of wavelength selective coupler 107 via a waveguide 108.

Wavelength selective coupler 107 has another input port connected to receive an optical input signal via a waveguide 109. Further, in one embodiment, waveguide 109 is connected to receive the optical input signal via an optical fiber 111. In other embodiments, the optical input signal can be received from a source disposed on semiconductor device 100.

Wavelength selective coupler 107 also has an output port connected to an optical input port of optical circuitry 104 via a waveguide 113. Amplification of the signal occurs in a section of waveguide 113. This section of waveguide can be straight or bended. Optical circuitry 104, in one embodiment, has an optical output port connected to a waveguide 115, which in turn is connected to an optical fiber 117. In other embodiments, waveguide 113 may be connected directly to optical fiber 117.

In this embodiment, waveguides 108, 109, 113 and 115 are each implemented in silicon substrate 103 so as to have a silicon core. In other embodiments, these waveguides may have a core formed from a different material or materials.

In operation, laser 106 provides an optical pump signal for use in amplifying an optical input signal of selected frequency via stimulated Raman scattering (SRS). SRS can occur in a medium propagating an optical signal of a given frequency (i.e., a pump signal) if the optical signal exceeds a threshold intensity for that material and frequency. When SRS occurs in the medium, some of the energy of the pump signal is converted to light of a different frequency. This difference or shift in frequency is called the Stokes frequency shift. For example, in silicon, the first order Stokes frequency is approximately 191.3 THz for a 1450 nm pump signal. Laser 106 outputs the pump signal of wavelength $\lambda_p$ via waveguide 108. In one embodiment, laser 106 is implemented with a laser diode lasing in the 14 XX nm wavelength range and having a power output ranging from 300–500 mW. Such laser diodes are commercially available.

A value for the SRS gain coefficient for a waveguide can be found by equation 1:

$$g = 16 \ \pi^3 c^2 S(h \ \omega_S^3 n_S^2 (N_0+1)\Gamma) \tag{1}$$

where S is the spontaneous Raman scattering coefficient (proportional to $\omega_S^4$), h is Planck's constant, $n_S$ is the refractive index of the waveguide core material at the Stoke's frequency, $\omega_S$ is the angular frequency of the Stokes emission, $N_0$ is the Bose factor and $\Gamma$ is one half the full width at half maximum of the Stokes line (in units of angular frequency). Equation 1 (due to the $\omega_S^4$ factor of S) shows that the gain coefficient is linearly dependent on the Stokes frequency.

Wavelength selective coupler 107 receives an optical input signal of wavelength $\lambda_1$ via waveguide 109. In this embodiment, $\lambda_1$ is selected so that its frequency is substantially equal to the first order Stokes frequency of the pump signal. Wavelength selective coupler 107 couples the input signal so that the input signal and the pump signal propagate in waveguide 113. As the input signal propagates with the pump signal, the input signal is amplified via SRS in waveguide 113. The gain provided by one embodiment of silicon-based SRS amplifier 102 can be estimated described below.

Experimental data is published for SRS in silicon at 77° K., a $\lambda_p$ of 1064 nm and scattering in the [111] crystalline axis of the silicon. Using this experimental data, the SRS gain coefficient for silicon using current telecommunication operating parameters can be predicted. For example, telecommunication systems typically operate at room temperature, with pump light having a wavelength in the 14XX nm range. In addition, optical signal propagation in silicon devices is typically in the [100] and [110] crystalline axes instead of [111] as in the experimental data.

Using these parameters and determining correction factors for these parameters from the experimental data, the gain coefficient can be estimated. For example, at 77° K., $(N_0+1)=1$ from the experimental data. Correcting for the change in line width and Bose factor due to temperature, at 300° K., $(N_0+1)=1.088$. As previously mentioned, the Raman gain is linearly dependent on the Stokes frequency. The gain coefficient from the experimental data (i.e., wavelength of 1064 nm) is multiplied by 0.718 and 0.674, respectively for embodiments using 1450 nm and 1535 pump wavelengths. In addition, for propagation along the [110] and [100] axes of silicon the conversion efficiency is about 90% of the conversion efficiency for propagation along the [111] axis of the experimental data.

Figure 2:
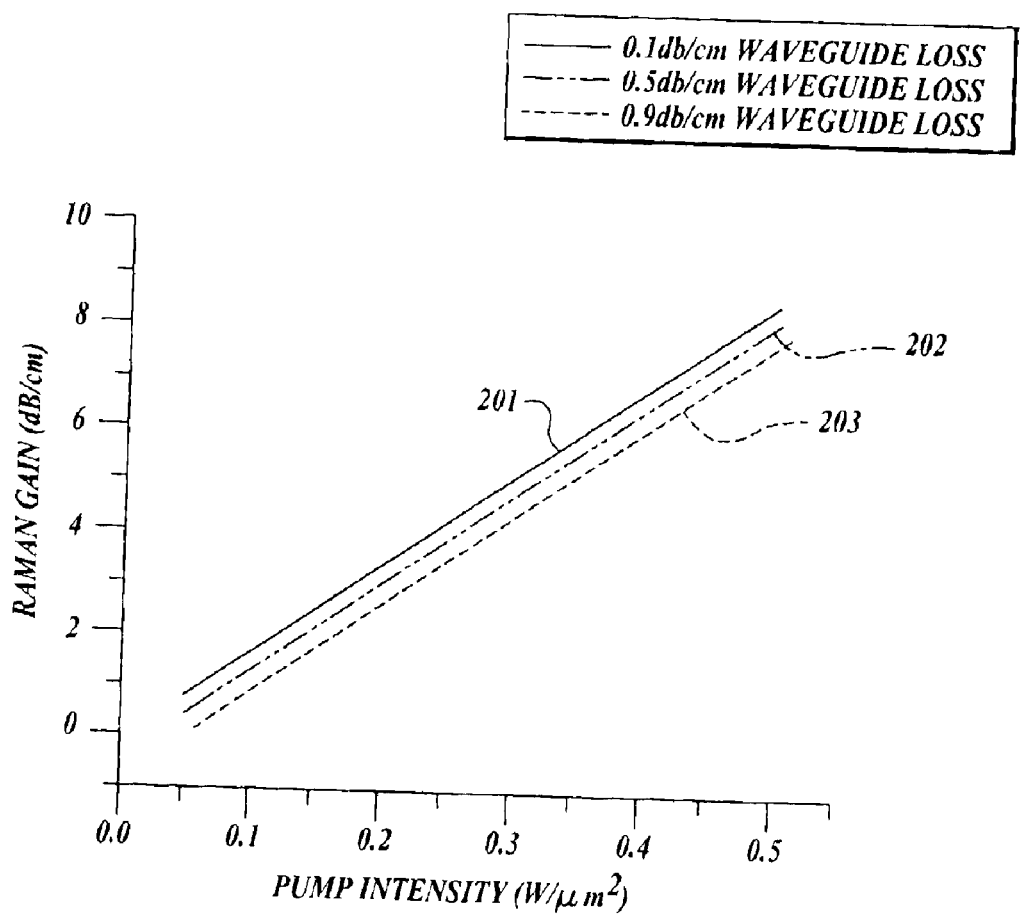
FIG. 2 is a graph illustrating the gains of the SRS amplifier depicted in FIG. 1.

Using the correction factors above, the gain coefficient at current telecommunications temperatures and frequencies can be estimated at about $4 \times 10^{-8}$ cm/V. FIG. 2 illustrates this gain coefficient with various values of waveguide loss. As shown in FIG. 2, the expected gain per unit length is linear with pump signal intensity. Thus, the length of waveguide 113 is selected to achieve the desired gain. In other embodiments, the temperature, refractive index and other parameters may be adjusted to achieve the desired gain.

The amplified optical signal is then received by optical circuitry 104, which then operates on the amplified signal. For example, optical circuitry 104 may include an array waveguide grating (AWG) to separate out the amplified input signal from the residual pump signal.

Since this embodiment of SRS amplifier 102 is implemented in silicon, SRS 102 can be advantageously integrated with other silicon-based optical circuitry (e.g., lasers, couplers, filters, gratings, receivers, transmitters, etc.) in a single monolithic device or chip. By integrating these optical components, significant improvements in performance and cost can be achieved. For example, in some conventional systems, non-silicon optical amplifiers would require hybrid packaging with typical silicon die, which can significantly increase cost, complexity, size (e.g., pitch) and signal loss.

Figure 3:
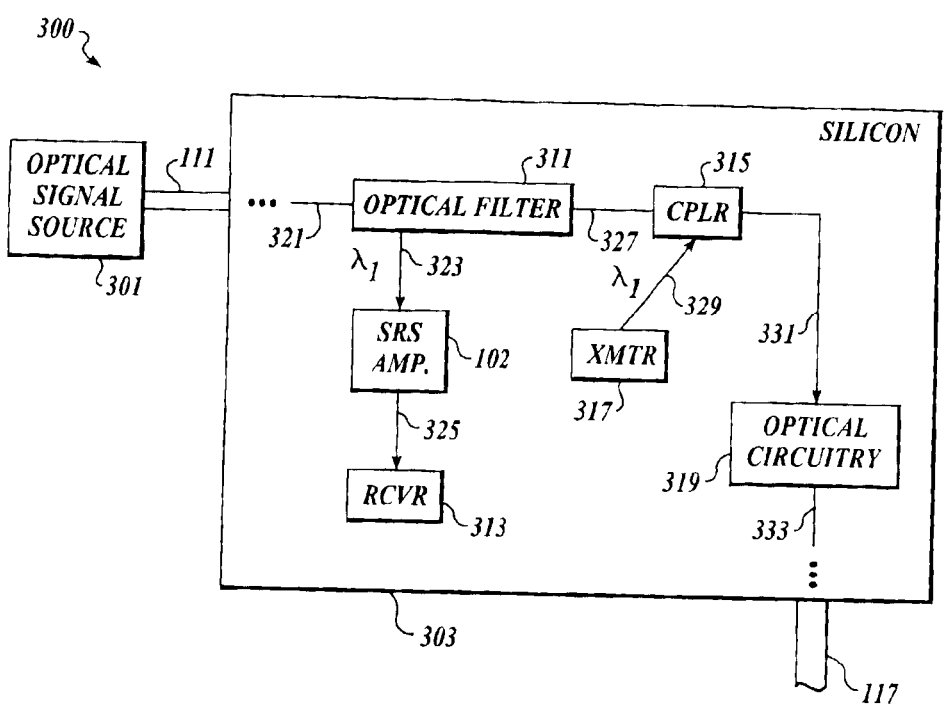
FIG. 3 is a simplified block diagram of an optical communication system containing the SRS amplifier depicted in FIG. 1.

FIG. 3 illustrates an exemplary optical communication system 300 containing SRS amplifier 102 (FIG. 1). In this exemplary embodiment, system 300 includes an optical signal source 301 and a planar lightwave circuit (PLC) 303 formed from silicon. In this embodiment, PLC 303 includes an optical filter 311, an optical receiver 313, an optical coupler 315, an optical transmitter 317 and optical circuitry 319. In this example, these elements of PLC 303 are used to implement an optical add/drop multiplexer.

The above elements of this embodiment of system 300 are interconnected as follows. Optical signal source 301 is connected to PLC 303 via optical fiber 111. Optical filter 311 has an input port connected to receive an optical signal from optical fiber 111 via waveguide 321. Optical filter 311 has an output port connected to the input port of SRS amplifier 102 via a waveguide 323, which in turn has its output port connected to an input port of optical receiver 313 via a waveguide 325. Optical filter 311 has another output port connected to an input port of coupler 315 via a waveguide 327. Coupler 315 has another input port connected to an output port of transmitter 317 via a waveguide 329, and has an output port connected to an input port of optical circuitry 319 via a waveguide 331. In this embodiment, optical circuitry 319 has an output port connected to optical fiber 117 via a waveguide 333. In other embodiments, waveguide 331 may be directly to optical fiber 117, bypassing optical circuitry 319.

This example system operates as follows. Optical signal source 301 is part of a WDM optical system, providing a multi-wavelength optical input signal (including $\lambda_1$ as shown in FIG. 1) for PLC 303. Optical filter 311 filters out a selected wavelength of the input signal. In this embodiment, optical filter 311 filters out the $\lambda_1$ wavelength, which SRS amplifier 102 amplifies as described above using SRS. The remaining wavelengths of the input signal are passed by optical filter 311 to coupler 315.

The amplified signal is then received by receiver 313 and converted to an electronic signal for processing by other units (not shown) of PLC 303. For example, the electronic signal can be provided to a processor (not shown) that extracts information modulated on the $\lambda_1$ wavelength signal.

Transmitter 317 outputs an optical signal of wavelength $\lambda_1$ to coupler 315. In this embodiment, the $\lambda_1$ wavelength signal is modulated with information for transmission to another unit of system 300. Coupler 315 combines the signal from transmitter 317 with the residual optical signal from optical filter 311 and outputs the combined signals onto waveguide 331. The combined signals can then be processed (e.g., amplified) and transmitted out of PLC 303 via waveguide 333 and optical fiber 117.

Figure 4:
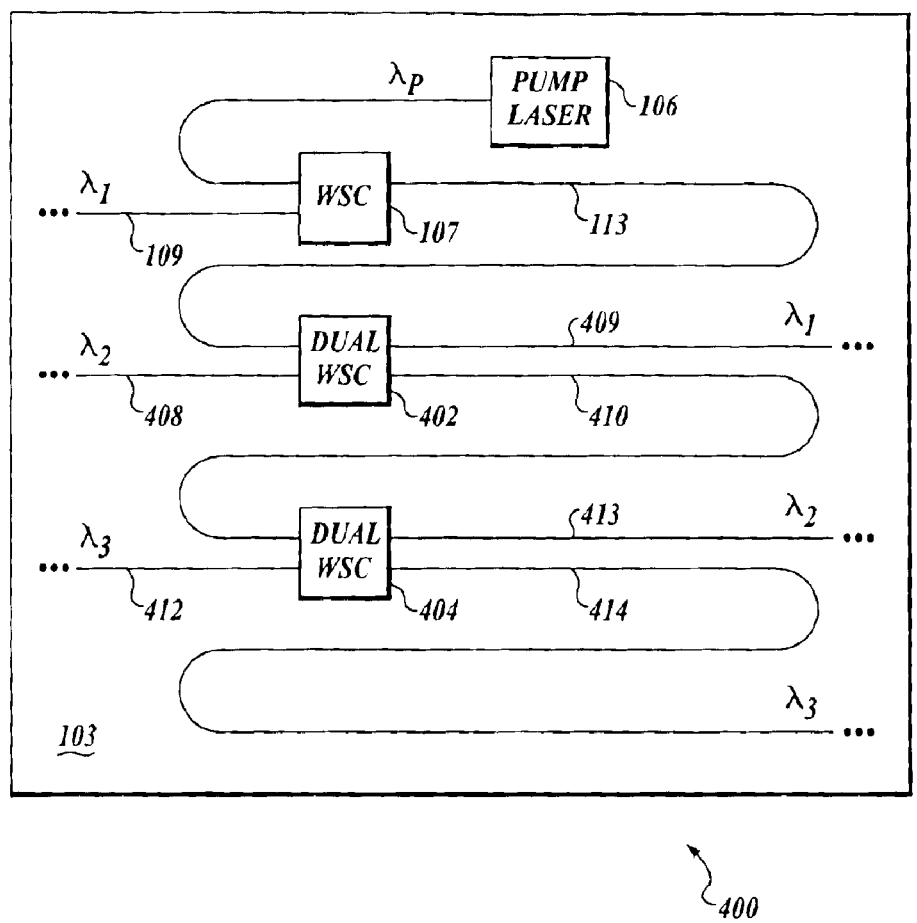
FIG. 4 is a block diagram of single pump silicon-based SRS amplifier array, according to one embodiment of the present invention.

FIG. 4 illustrates a single pump silicon-based SRS amplifier array 400, according to one embodiment of the present invention. This embodiment is similar to SRS amplifier 102 (FIG. 1), with the addition of dual wavelength selective couplers 402 and 404, which are also implemented in silicon substrate 103.

The above elements of array 400 are interconnected as follows. Coupler 402 has one input port connected to the output port of coupler 107 via waveguide 113 and another input port connected to receive an input signal of wavelength $\lambda_2$ via a waveguide 408. Coupler 402 has one output port connected to a waveguide 409 and another output port connected to a waveguide 410. Coupler 404 has one input port connected to waveguide 410 and another input port connected to receive an input signal of wavelength $\lambda_3$ via a waveguide 412. Coupler 404 has one output port connected to a waveguide 413 and another output port connected to a waveguide 414.

In operation, laser 106 outputs the pump signal of wavelength $\lambda_p$ to coupler 107 to be used in amplifying the $\lambda_1$ input signal as described above in conjunction with FIG. 1. The amplified $\lambda_1$ signal along with the residual pump signal propagates to coupler 402 via waveguide 113.

Coupler 402 is a dual wavelength selective coupler, causing the amplified signal of wavelength $\lambda_1$ to propagate in waveguide 409 while causing the input signal of wavelength $\lambda_2$ and the residual pump signal to propagate in waveguide 410. Laser 106 provides the pump signal with enough power so that SRS scattering occurs in waveguide 410 (and 414) after the $\lambda_1$ (and $\lambda_2$) input signal is amplified. Thus, SRS occurs in waveguide 410, which can then be used to amplify the $\lambda_2$ input signal. Note, although the $\lambda_1$ input signal is at the Stokes frequency, the Stokes frequency represents the frequency at which the peak intensity emission occurs. Depending on the medium, a finite range of frequencies centered on the Stokes frequency is also emitted and can be used for amplifying signals with wavelengths within this range. In this embodiment, $\lambda_2$ is selected to be within the range of SRS emissions for silicon so that the $\lambda_2$ input signal is amplified as it propagates in waveguide 410 along with the residual pump signal.

Coupler 404 is also a dual wavelength selective coupler. Thus, coupler 404 similarly causes the amplified $\lambda_2$ signal to propagate in waveguide 413 while causing the input signal of wavelength $\lambda_3$ and the residual pump signal to propagate in waveguide 414. In this embodiment, $\lambda_3$ is also selected to be within the range of SRS emissions for silicon so that the $\lambda_3$ input signal is amplified as it propagates in waveguide 410 along with the residual pump signal.

Figure 5:
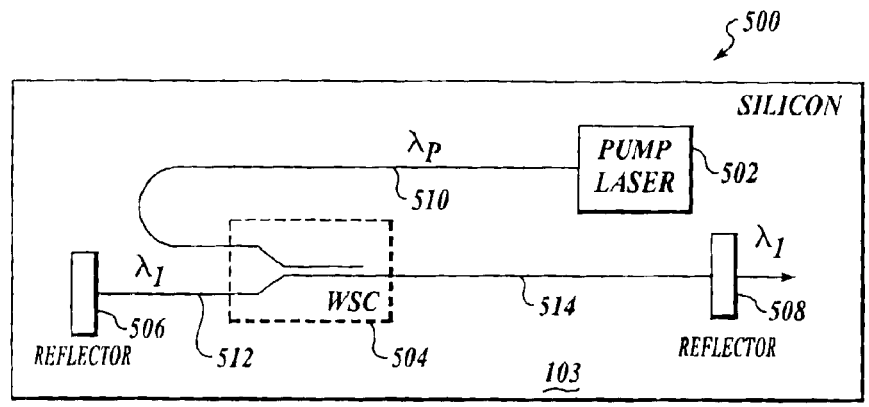
FIG. 5 is a block diagram of a silicon-based SRS laser, according to one embodiment of the present invention.

FIG. 5 illustrates a silicon-based SRS laser 500, according to one embodiment of the present invention. In this embodiment, laser 500 includes a narrow line width pump laser 502, a wavelength selective coupler 504, reflectors 506 and 508 and waveguides 510, 512 and 514. Waveguides 510, 512 and 514 have cores formed from the silicon substrate 103.

Pump laser 502 has an output port connected to one port of coupler 514 via waveguide 510. Coupler 504 also has ports connected to reflectors 506 and 508 via waveguides 512 and 514, respectively. In one embodiment, reflectors 506 and 508 are Bragg gratings disposed in silicon (e.g., by alternating regions of silicon and another material of different refractive index). In other embodiments, different reflector implementations can be used. In this embodiment, the reflectors are selected to have a relatively high reflectivity for the Stokes line signal, with one being slightly less to serve as an output port. In addition, reflectors 506 and 508 are selected to have relatively high transmission at the pump wavelength.

In operation, one embodiment of pump laser 502 is a laser diode lasing at 1455 nm with an intensity sufficient to cause SRS in silicon, which results in a Stokes line at 1574 nm. Reflectors 506 and 508, in this embodiment, are narrow band reflectors that are highly reflective at 1574 nm. Therefore, a laser is formed that outputs a 1574 nm signal. In other embodiments, the reflectors may be narrow band reflectors at different wavelengths, but within the emission range of SRS of the silicon of silicon substrate 103. This configuration can also be used as a wavelength converter, converting a signal of the pump wavelength to one of the Stokes shifted wavelength.

In an alternative embodiment, the reflectors can be tunable in reflective wavelength, thereby allowing the laser output signal to have a tunable wavelength within the aforementioned finite range about the Stokes wavelength. For example, the reflectors can be implemented using tunable Bragg gratings.

Figure 6:
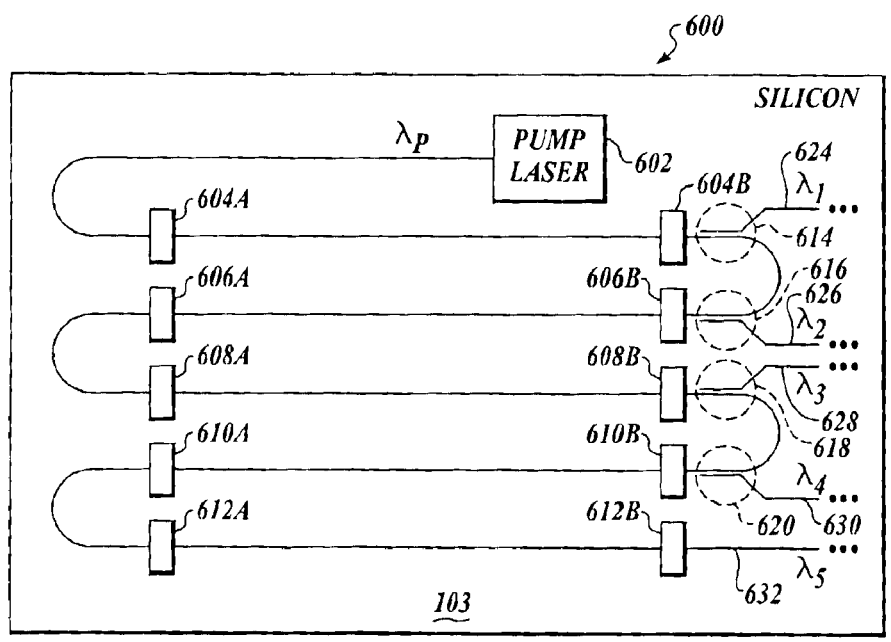
FIG. 6 is a block diagram of a single pump silicon-based SRS multi-wavelength laser, according to one embodiment of the present invention.

FIG. 6 illustrates a single pump silicon-based SRS multi-wavelength laser 600, according to one embodiment of the present invention. This embodiment is similar to laser 500 (FIG. 5) with the addition of four pairs of narrow band reflectors 604A/604B, 606A/606B, 608A/608B, 610A/610B and 612A/612B. Each pair of reflectors has a different reflection wavelength within the emission range of SRS in silicon. In addition, laser 600 includes wavelength selective couplers 614, 616, 618, and 620.

In this embodiment, the above reflectors are Bragg gratings formed in waveguides having cores formed from silicon substrate 103.

In operation, reflectors 604A and 604B, coupler 614 and laser pump 602 form a laser substantially similar to laser 500 (FIG. 5) with laser output at wavelength $\lambda_1$ at an output waveguide 624.

Coupler 614 also causes the residual pump signal to propagate to reflectors 606A and 606B formed in a waveguide connected to coupler 616. Reflectors 606A and 606B form a laser that lases at wavelength $\lambda_2$, which coupler 616 outputs at a waveguide 626.

The residual pump signal propagates to reflectors 608A and 608B formed in a waveguide connected to reflector 606A. Reflectors 608A and 608B form a laser that lases at wavelength $\lambda_3$, which coupler 618 outputs at a waveguide 628. Coupler 618 also causes the residual pump signal to propagate to reflectors 610A and 610B formed in a waveguide connected to coupler 618.

Reflectors 610A and 610B form a laser that lases at wavelength $\lambda_4$, which coupler 620 outputs at a waveguide 630. The residual pump signal propagates to reflectors 612A and 612B formed in a waveguide connected to reflector 610A. Reflectors 612A and 612B form a laser that lases at wavelength $\lambda_5$, which is output via a waveguide 632. Pump laser 602 outputs the pump signal with sufficient intensity to cause SRS in the waveguides between all of the reflector pairs.

Figure 7:
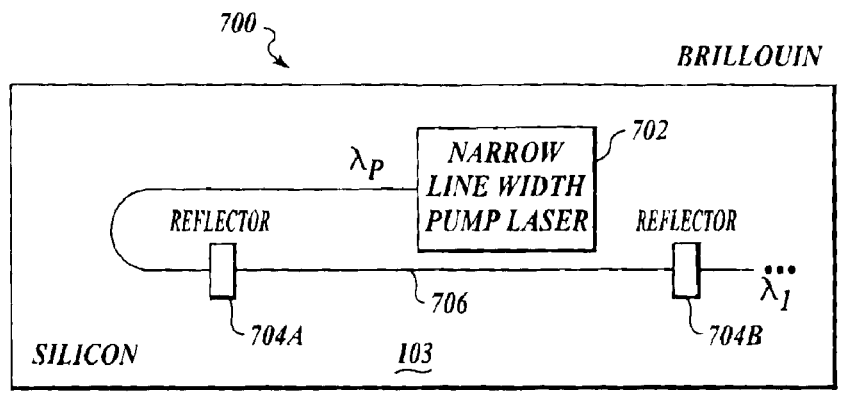
FIG. 7 is a block diagram of a silicon-based stimulated Brillouin scattering (SBS) laser, according to one embodiment of the present invention.

FIG. 7 illustrates a silicon-based stimulated Brillouin scattering (SBS) laser 700, according to one embodiment of the present invention. SBS is similar to SRS in that a pump signal exceeding a threshold intensity will cause SBS to occur in certain mediums. In one embodiment, the shifted SBS frequency is approximately 50 GHz in silicon. In SBS, the intensity of the shifted signal has a maxima in the opposite direction opposite that of the pump signal (unlike SRS). SBS laser 700 includes a narrow linewidth pump laser 702 and reflectors 704A and 704B formed in a waveguide 706 propagating the pump signal from pump laser 702. Reflectors 704A and 704B are narrow band reflectors that are highly reflective for the wavelength of the SBS shifted signal and highly transmissive for the wavelength of the pump signal.

Figure 8:
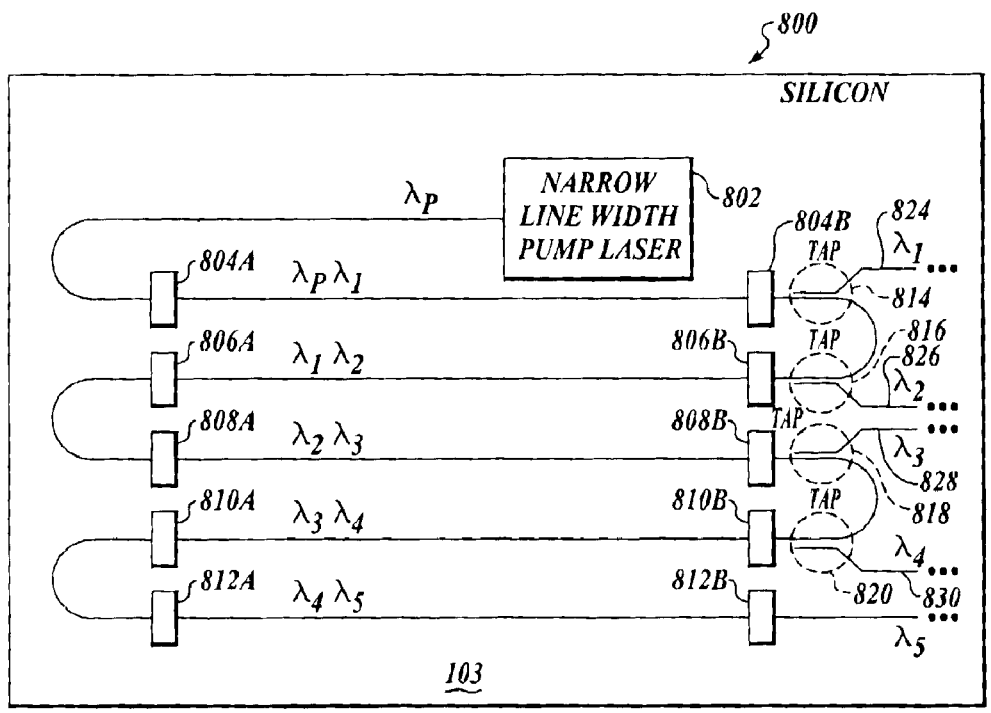
FIG. 8 is a block diagram of a single pump silicon-based SBS multi-wavelength multi-output laser, according to one embodiment of the present invention.

FIG. 8 illustrates a single pump silicon-based SBS multi-wavelength multi-output laser 800, according to one embodiment of the present invention. In this embodiment, laser 800 includes reflector pairs 804A/804B, 806A/806B, 808A/808B, 810A/810B and 812A/812B, and tap couplers 814, 816, 818 and 820. Reflector pairs 804A/804B, 806A/806B, 808A/808B, 810A/810B and 812A/812B are formed to be highly reflective at wavelengths $\lambda_1$, $\lambda_2$, $\lambda_3$, $\lambda_4$ and $\lambda_5$, respectively, while allowing other wavelengths to pass.

Pump laser 802 and reflectors 804A and 804B generate a $\lambda_1$ wavelength SBS laser signal as described above in conjunction with FIG. 7. Tap coupler 814 taps a portion of the $\lambda_1$ laser signal to an output waveguide 824, while propagating the rest of the $\lambda_1$ laser signal to reflectors 806A and 806B. This portion of the $\lambda_1$ laser signal serves as the pump signal for the $\lambda_2$ laser formed by reflectors 806A and 806B.

Tap coupler 816 taps a portion of the $\lambda_2$ laser to an output waveguide 826, while propagating the rest of the $\lambda_2$ laser signal to reflectors 808A and 808B to serve as the pump signal for the $\lambda_3$ laser formed by reflectors 808A and 808B.

Tap coupler 818 taps a portion of the $\lambda_3$ laser to an output waveguide 828, while propagating the rest of the $\lambda_3$ laser signal to reflectors 810A and 810B to serve as the pump signal for the $\lambda_4$ laser formed by reflectors 810A and 810B.

Tap coupler 820 taps a portion of the $\lambda_4$ laser to an output waveguide 830, while propagating the rest of the $\lambda_4$ laser signal to reflectors 812A and 812B to serve as the pump signal for the $\lambda_5$ laser formed by reflectors 812A and 812B.

Figure 9:
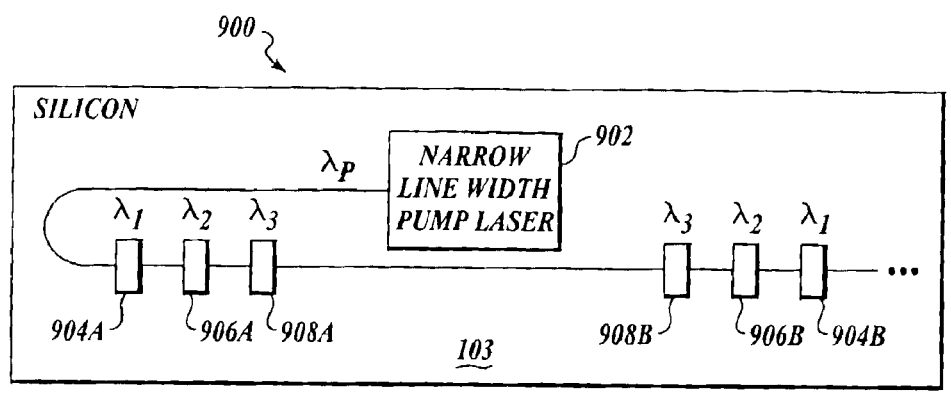
FIG. 9 is a block diagram of a single pump silicon-based SBS multi-wavelength single-output laser, according to one embodiment of the present invention.

FIG. 9 illustrates a single pump silicon-based SBS multi-wavelength single-output laser 900, according to one embodiment of the present invention. In this embodiment, laser 900 includes three pairs of narrow band reflectors 904A/904B, 906A/906B and 908A/908B formed in silicon substrate 103 to have silicon cores. Reflectors 904A/904B, 906A/906B and 908A/908B are highly reflective at wavelengths $\lambda_1$, $\lambda_2$, and $\lambda_3$, respectively, while allowing other wavelengths to pass. In this embodiment, reflectors 904A and 9048 are disposed outside of reflectors 906A and 906B, which in turn are disposed outside of reflectors 908A and 908B. In this way, Reflectors 904A/904B, 906A/906B and 908A/908B respectively form lasers of wavelengths $\lambda_1$, $\lambda_2$, and $\lambda_3$, which are output on a single waveguide. The different laser signals can be separated with other optical circuitry such as an AWG (not shown) as required.

Embodiments of method and apparatus for SRS and SBS amplifiers, lasers and wavelength converters are described herein. In the above description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring the description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to be limitation to the precise forms disclosed. While specific embodiments of, and examples for, the invention are described herein for illustrative purposes, various equivalent modifications are possible, as those skilled in the relevant art will recognize.

These modifications can be made to embodiments of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An apparatus, comprising:
a waveguide disposed in a semiconductor material to receive a pump optical signal of a pump wavelength and having a power level sufficient to cause emission of a first optical signal when the pump optical signal is propagated in the waveguide, the first optical signal having a wavelength range;
a first coupler to receive a second optical signal having a second wavelength within the wavelength range and to combine the second optical signal with the pump optical signal and the first optical signal within the waveguide to amplify the second optical signal within the waveguide; and
a second coupler to receive a third optical signal having a third optical wavelength within the wavelength range and to combine the third optical signal with the pump signal and the first optical signal within the waveguide to amplify the third optical signal.

2. The apparatus of claim 1 wherein the semiconductor material comprises silicon, and wherein the waveguide's core is silicon.

3. The apparatus of claim 1 wherein the second and third optical signals are amplified by the first optical signal as they propagate through the waveguide.

4. The apparatus of claim 3 wherein a gain of the amplification increases linearly with the waveguide's length.

5. The apparatus of claim 1 further comprising optical circuitry, disposed in the semiconductor material, to receive the second optical signal output from the second coupler.

6. The apparatus of claim 1 wherein the first and second couplers are wavelength selective couplers disposed in the semiconductor material.

7. The apparatus of claim 1 further comprising a laser disposed in the semiconductor material to provide the pump optical signal.

8. The apparatus of claim 1 wherein the pump optical signal causes stimulated Raman scattering (SRS) in the waveguide.

9. The apparatus of claim 8 wherein the second signal has a frequency that is substantially equal to a Stokes frequency of the SRS that occurs in the waveguide.

10. The apparatus of claim 1, wherein the second coupler is configured to output the second optical signal from the waveguide.

11. An apparatus, comprising:
a waveguide disposed in a semiconductor material to receive a first optical signal of a first wavelength and having a first power level, wherein the first power level is sufficient to cause emission of a second optical signal of a second wavelength when the first optical signal is propagated in the waveguide; and
a coupler to receive the first optical signal and an input optical signal having a third wavelength different from the first wavelength, the coupler to cause an optical output signal to propagate in the waveguide, the optical output signal including at least parts of the input signal and the first optical signal, wherein the first optical signal causes stimulated Brillouin scattering (SBS) in the waveguide.

12. The apparatus of claim 11 wherein the input signal has a frequency that is substantially equal to a Brillouin frequency of the SBS that occurs in the waveguide.

13. A method comprising:
receiving a multi-wavelength optical input including multiple optical signals;
separating a first optical signal having a first wavelength from the multiple optical signals;
propagating a pump optical signal in a waveguide having a core formed in a semiconductor material, the pump optical signal having a pump wavelength and a power level sufficiently great to cause a second optical signal of a second wavelength to propagate in the waveguide;
coupling the first optical signal with the second optical signal into the waveguide to amplify the first optical signal, the first wavelength of the first optical signal different from the pump wavelength; and
adding a third optical signal having the first wavelength to the multiple optical signals after the separating of the first optical signal.

14. The method of claim 13 wherein the semiconductor material comprises silicon.

15. The method of claim 13 wherein the first and second wavelengths are substantially equal.

16. The method of claim 13 wherein the first wavelength of the first optical signal is amplified as it propagates through the waveguide.

17. The method of claim 16 wherein a gain of the amplification increases linearly with the waveguide's length.

18. The method of claim 16 wherein the pump optical signal causes stimulated Raman scattering (SRS) in the waveguide.

19. The method of claim 18 wherein the first optical signal has a frequency that is equal to a Stokes frequency of the SRS that occurs in the waveguide.

20. The method of claim 16 wherein the pump optical signal causes stimulated Brillouin scattering (SBS) in the waveguide.

21. The method of claim 20 wherein the first optical signal has a frequency that is equal to a Brillouin frequency of the SBS that occurs in the waveguide.

22. A system comprising:
an optical signal source to output a first optical signal of a first wavelength; and
a silicon semiconductor device to receive the first optical signal, the silicon semiconductor device including:
a waveguide disposed in semiconductor material of the silicon semiconductor device to receive a second optical signal of a second wavelength different from the first wavelength, the second optical signal having an intensity that is sufficient to cause emission of a third optical signal of a third wavelength different from the second wavelength when the second optical signal is propagated in the waveguide;
a coupler disposed in semiconductor material of the semiconductor device to receive the first and second optical signals, the coupler to cause an optical output signal to propagate in the waveguide, the optical output signal including at least parts of the first and second optical signals; and a laser source integrated into the silicon semiconductor device to generate the second optical signal.

23. The system of claim 22 wherein the waveguide's core is silicon.

24. The system of claim 22 wherein the first and third wavelengths are substantially equal.

25. The system of claim 22 wherein the first wavelength of the first optical signal is amplified as it propagates through the waveguide.

26. The system of claim 25 wherein a gain of the amplification increases linearly with the waveguide's length.

27. The system of claim 22 wherein the semiconductor device further comprises optical circuitry disposed in semiconductor material of the silicon semiconductor device to receive the optical output from the coupler.

28. The system of claim 22 wherein the coupler is a wavelength selective coupler.

29. The system of claim 22 wherein the second optical signal causes stimulated Raman scattering (SRS) in the waveguide.

30. The system of claim 29 wherein the first optical signal has a frequency that is substantially equal to a Stokes frequency of SRS that occurs in the waveguide.

31. The system of claim 22 wherein the second optical signal causes stimulated Brillouin scattering (SBS) in the waveguide.

32. The system of claim 31 wherein the first optical signal has a frequency that is substantially equal to a Brillouin frequency of the SBS that occurs in the waveguide.

33. The system of claim 22 wherein the semiconductor device includes first and second reflectors disposed in the waveguide.

34. The system of claim 33 further comprising third and fourth reflectors coupled to the waveguide.

35. The system of claim 33 wherein the first and second reflectors are gratings.

36. The system of claim 35 wherein each grating includes a plurality of parallel regions of non-semiconductor material formed in the waveguide.

37. An apparatus, comprising:
a waveguide disposed in a semiconductor material to receive a pump optical signal of a pump wavelength and having a power level sufficient to cause emission of a first optical signal having a wavelength range when the pump optical signal is propagated in the waveguide; and
a first pair of reflectors disposed in the waveguide being reflective for a second wavelength within the wavelength range of the first optical signal and substantially transmissive for the pump wavelength, the first pair of reflectors to generate a second optical signal of the second wavelength.

38. The apparatus of claim 37, wherein the semiconductor material comprises silicon, and wherein the waveguide's core comprises silicon.

39. The apparatus of claim 37, wherein the first pair of reflectors comprise gratings.

40. The apparatus of claim 39, wherein the first pair of gratings comprise tunable gratings to selectively tune the second wavelength within the wavelength range of the first optical signal.

41. The apparatus of claim 37, further comprising:
a second pair of reflectors disposed in the waveguide to receive the pump optical signal after passing through the first pair of reflectors, the second pair of reflectors substantially transmissive for the pump wavelength and reflective for a third wavelength within the wavelength range of the first optical signal, but different from the second wavelength, the second pair of reflectors to generate a third optical signal having the third wavelength;

a first output waveguide coupled to receive at least a portion of the second optical signal output from the first pair of reflectors; and a second output waveguide coupled to receive at least a portion of the third optical signal output from the second pair of reflectors.

42. The apparatus of claim 37, further comprising:

a second pair of reflectors disposed in the waveguide between the first pair of reflectors, the second pair of reflectors substantially transmissive for the pump wavelength and the second wavelength, but reflective for a third wavelength within the wavelength range of the first optical signal, the third wavelength different than the second wavelength, the second pair of reflectors to generate a third optical signal having the third wavelength.

43. The apparatus of claim 37, wherein the pump optical signal causes stimulated Raman scattering (SRS) within the waveguide.

44. The apparatus of claim 37, wherein the pump optical signal causes stimulated Brillouin scattering (SBS) within the waveguide.

* * * * *